United States Patent
Munn

(10) Patent No.: US 10,379,802 B2
(45) Date of Patent: Aug. 13, 2019

(54) DYNAMIC USER IDENTIFICATION FOR NETWORK CONTENT FILTERING

(71) Applicant: Verizon Patent and Licensing Inc., Arlington, VA (US)

(72) Inventor: Jude M. Munn, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 410 days.

(21) Appl. No.: 14/741,351

(22) Filed: Jun. 16, 2015

(65) Prior Publication Data

US 2016/0371045 A1 Dec. 22, 2016

(51) Int. Cl.
*G06F 3/14* (2006.01)
*H04L 29/08* (2006.01)
*G06F 21/55* (2013.01)
*G06F 16/00* (2019.01)
*H04L 29/06* (2006.01)
*H04N 21/00* (2011.01)

(52) U.S. Cl.
CPC ............ *G06F 3/1415* (2013.01); *G06F 16/00* (2019.01); *G06F 21/55* (2013.01); *H04L 67/22* (2013.01); *H04L 67/306* (2013.01); *G09G 2358/00* (2013.01); *G09G 2370/022* (2013.01); *G09G 2370/16* (2013.01); *H04L 69/16* (2013.01); *H04N 21/00* (2013.01)

(58) Field of Classification Search
None
See application file for complete search history.

(56) References Cited

U.S. PATENT DOCUMENTS

| | | | | |
|---|---|---|---|---|
| 5,193,114 A | * | 3/1993 | Moseley | G06Q 20/341 340/5.85 |
| 8,478,708 B1 | * | 7/2013 | Larcom | G06Q 10/10 706/52 |
| 8,762,517 B2 | * | 6/2014 | Woundy | H04L 41/0896 709/224 |
| 9,277,275 B1 | * | 3/2016 | Arini | H04N 21/441 |
| 2008/0134282 A1 | * | 6/2008 | Fridman | G06Q 10/10 726/1 |
| 2010/0325258 A1 | * | 12/2010 | Carpenter | G06F 11/3414 709/224 |
| 2015/0156183 A1 | * | 6/2015 | Beyer | H04L 63/08 726/4 |
| 2016/0203509 A1 | * | 7/2016 | Sharp, III | G06Q 30/0244 705/14.43 |

* cited by examiner

*Primary Examiner* — Viet D Vu
*Assistant Examiner* — James A Edwards

(57) ABSTRACT

Techniques described herein may be used to dynamically apply content filters to a user device by identifying the user operating the user device. An analytics server may collect information relevant to identifying the user, or the type of user (e.g., a child, a teenager, or an adult), and cause a content filter to be applied to the user device based on the user and content requested by the user. As such, systems and methods described herein provide techniques for applying a content filters based on the actual user that is operating the user device, as opposed to the just the user device itself.

20 Claims, 9 Drawing Sheets

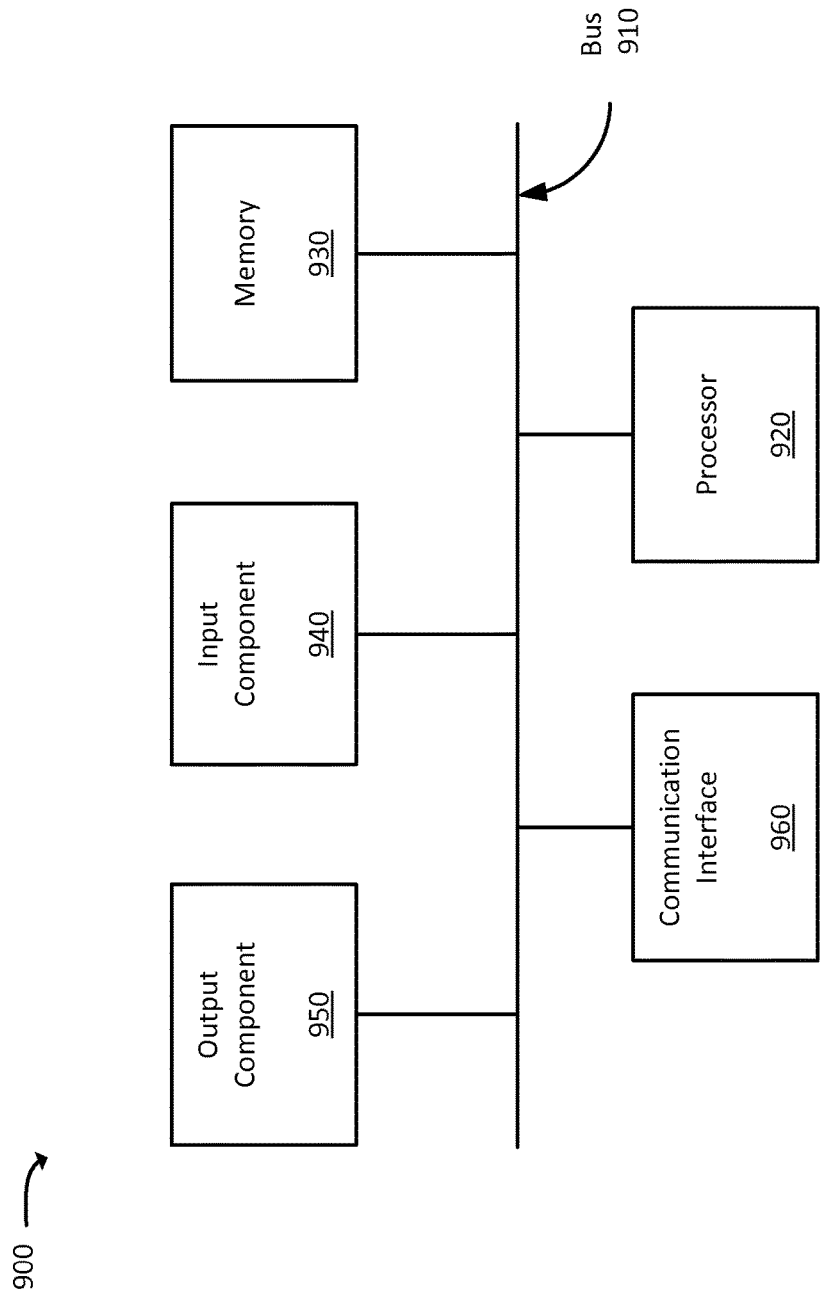

DYNAMIC USER IDENTIFICATION FOR NETWORK CONTENT FILTERING

BACKGROUND

Internet service providers (ISPs) frequently offer a variety of products and services to consumers. For instance, an individual may purchase network services (e.g., Internet access) that are provided to a home or business of the individual. The network services may be enhanced by other products or services offered by the ISP, such as a service to block certain types of content (e.g., mature content) that might be inappropriate or undesirable.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 9 is a diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to dynamically apply content filters to user devices based on the identity of a user operating the user devices. For instance, an analytics server may determine that a child is operating a laptop computer and may decide to have a content filter applied to the laptop computer so that the child is protected from inappropriate content. If the child later operates a smart phone, the analytics server may become aware of this transition and, as a result, may remove the content filter from the laptop computer and apply the content filter to the smart phone. As such, systems and methods described herein provide techniques for applying content filters based on the identity of the user that is operating the user device, as opposed to the user device itself.

Figure 1:
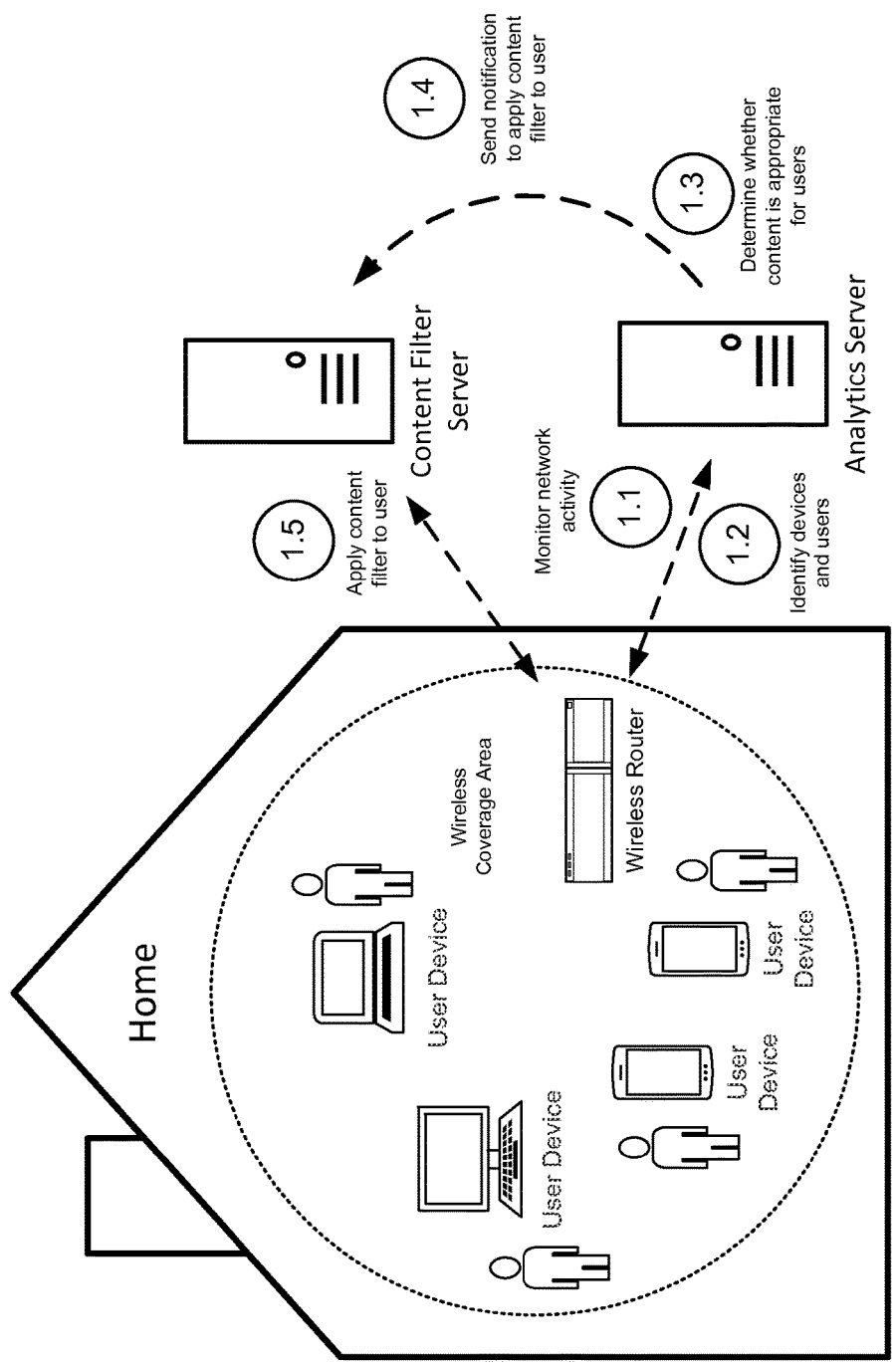
FIG. 1 illustrates an example overview of an implementation described herein.

FIG. 1 illustrates an example overview of an implementation described herein. As shown in FIG. 1, a home may include a wireless router that connects various user devices to an external network (e.g., the Internet). While the analytics server may not be capable (e.g., have access) to see past the router and monitor the user devices within the home directly, the analytics server may monitor and analyze network activity coming from the home (at 1.1) to identify the user devices connected to the wireless router and the users operating the user devices (at 1.2). The users operating the user devices may be identified based on the network traffic. For instance, a user may be identified as a child when the corresponding user device demonstrates a pattern of visiting websites directed to children, whereas another user may be identified as an adult when the corresponding user device demonstrates a pattern of visiting websites directed to adults.

The analytics server may monitor the network content (e.g., websites, images, videos, etc.) requested by the user devices and determine whether the network content is suitable for the user requesting the content (at 1.3). When the network content is not suitable for the particular user, the analytics server may communicate with a content filter server (at 1.4) so that a content filter is applied to the user device being used by the particular user (at 1.5). As such, techniques described herein provide a dynamic solution to applying content filters that can be tailored to whether network content requested by a user is appropriate for the user.

Figure 2:
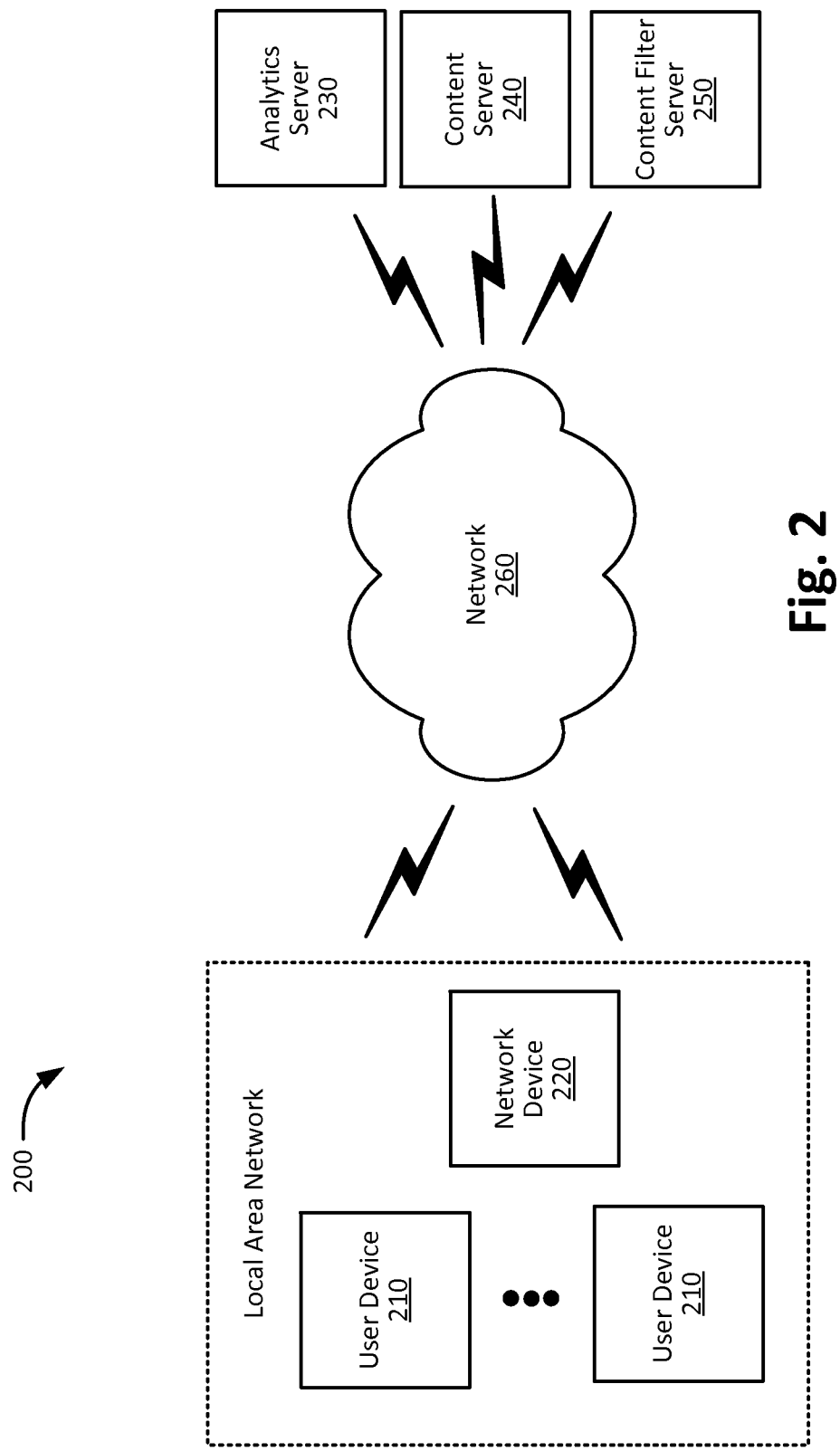
FIG. 2 is a diagram of an example environment in which systems and/or methods described herein may be implemented.

FIG. 2 is a diagram of an example environment 200 in which systems and/or methods described herein may be implemented. Environment 200 may include a local area network that includes one or more user devices 210 and network device 220. Environment 200 may also include analytics server 230, content server 240, content filter server 250, and network 260.

User device 210 may include a portable computing and communication device, such as a personal digital assistant (PDA), a smart phone, a cellular phone, a laptop computer with connectivity to a cellular wireless network, a tablet computer, etc. UE 210 may also include non-portable computing devices, such as desktop computers, consumer or business appliances, or other devices that have the ability to wirelessly connect to wireless network 260 via network device 220. User device 210 may access content (e.g., images, music, videos, websites, web services, etc.) provided by content server 240.

Network device 220 may include computing and communication devices that act to create a local area network consisting of user devices 210. Network device 220 may route network traffic to and from user devices 210, implement various network rules and protocols, provide network security services, and more. Network device 220 may be, or include, a router, switch, hub, gateway, modem, etc. Additionally, network device 220 may provide a connection to an external network, such as network 260. In some implementations, network device 220 may connect with network 260 via a wired or wireless connection.

Analytics server 230 may include a computing and communication device that monitors and analyzes network traffic corresponding to user devices 210 of the local area network. Based on network traffic and other types of information, analytics server 230 may identify user devices 210 within the local area network, and particular users operating user devices 220. Analytics server 230 may monitor network content that is requested by user devices 210 and may determine whether the network content is appropriate for the user operating user device 210. When the network content is inappropriate, analytics server 230 may communicate with content filter server 250 so that the inappropriate network content is not accessible to the particular user device 210. In some implementations, analytics server 230 may generate network activity reports describing users and user devices 210 that have accessed, or have attempted to access, inappropriate content, in addition to general usage information (e.g., times, dates, content accessed, amount of content accessed, specific sources of content, etc.).

Content server 240 may include one or more computing devices, such as a server device or a collection of server devices associated with a content provider that may provide content to user devices 210. In some implementations, content server 260 be a web server that hosts webpages and/or other content. Additionally, or alternatively, a link to content stored by content server 240 may be presented within an application or webpage associated with a different web server or application server. Content server 240 may store multiple different types of content (e.g., images, videos, audio, etc.).

Content filter server 250 may include a computing and communication device that operates to impose network content filters. In some implementations, content filter server 250 may apply content filters to one or more network entities, such as a single device, a group of devices, a network, or groups of networks. In addition, content filter server 250 may apply different types of content filters. For instance, content filter server 250 may apply a more lenient content filter to the local area network in a home, but may also apply stricter content filters to particular user devices 210 that are being operated by certain users. An example of a more lenient content filter may include a content filter that blocks only content directed to mature audiences. An example of a stricter content filter may include a content filter that blocks content directed to teenage audiences and mature audiences. As mentioned above, content filter server 250 may also be capable of dynamically applying content filters to a particular device in response to, for example, a request from analytics server 230.

Network 260 may include one or more wired and/or wireless networks. For example, network 260 may include a cellular network (e.g., a second generation (2G) network, a third generation (3G) network, a fourth generation (4G) network, a fifth generation (5G) network, a long-term evolution ("LTE") network, a global system for mobile ("GSM") network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
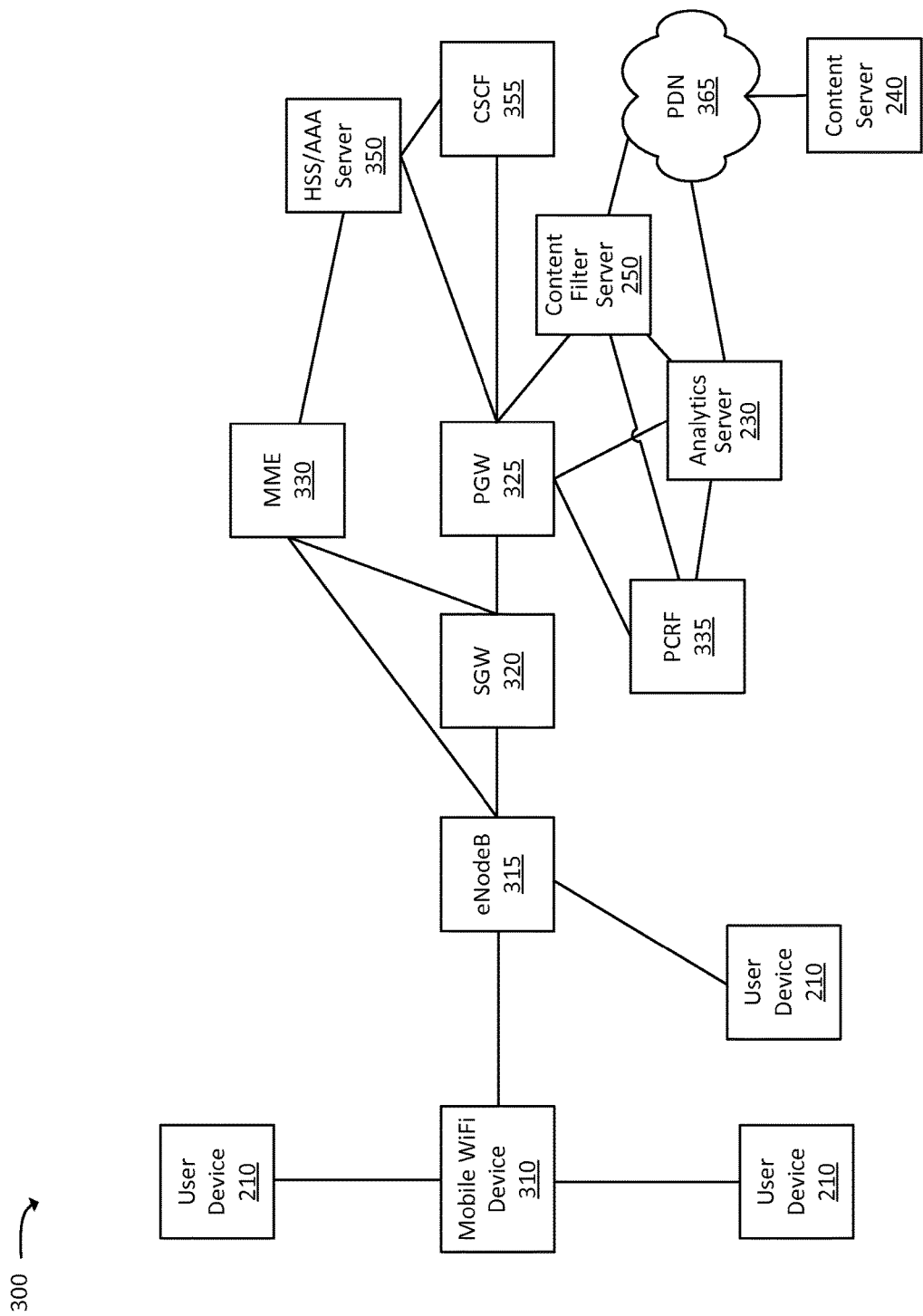
FIG. 3 is a diagram of an example telecommunications network in which systems and/or methods described herein may be implemented.

FIG. 3 is a diagram of an example telecommunications network 300 in which systems and/or methods described herein may be implemented. As shown in FIG. 3, telecommunications network 300 may include one or more user devices 210, evolved node B (eNodeB) 315, serving gateway (SGW) 320, packet data network (PDN) gateway (PGW) 325, mobility management entity device (MME) 330, home subscriber server (HSS)/authentication, authorization, accounting (AAA) server 350 (hereinafter referred to as HSS/AAA server 350), call server control function (CSCF) 355, PDN 365, and content server 240.

User device 210, analytics server 230, content server 240, and content filter server 250 are described above with reference to FIG. 2. Additionally, in some implementations, analytics server 230 and content filter server 250 may not be stand alone or external server devices. Instead, analytics server 230 and content filter server 250 a single device and/or may be integrated as hardware and/or software in another device, such as PGW 325.

Telecommunications network 300 may include an evolved packet system (EPS) that includes an LTE network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 320, PGW 325, and/or MME 330, and may enable user device 210 to communicate with network 260 and/or the IMS core. The IMS core may include HSS/AAA server 350 and/or CSCF 355. The IMS core may manage authentication, connection initiation, account information, a user profile, etc. associated with user device 210.

Mobile WiFi device 310 may include one or more network devices that receive, process, and transmit network traffic between user devices 210 and eNodeB 315. Mobile WiFi device 310 may be a portable device capable communicating via a variety of wireless communication protocols. In some implementations, mobile WiFi device 310 may include a mobile hotspot device. In some implementations, mobile WiFi device 310 may be an example of network device 220 of FIG. 2.

eNodeB 315 may include one or more network devices that receive, process, and/or transmit traffic, such as audio, video, text, and/or other data, destined for and/or received from user device 210. eNodeB 315 may receive traffic from and send traffic to PDN 365 via SGW 320 and PGW 325. eNodeB 315 may send traffic to and receive traffic from user device 210 via an air interface. One or more eNodeBs 315 may be associated with a RAN, such as the LTE network.

SGW 320 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 320 may, for example, aggregate traffic received from one or more base stations 315 and may send the aggregated traffic to network 260 via PGW 325. In one example implementation, SGW 320 may route and forward user data packets, may act as a mobility anchor for a user plane during inter-eNB handovers, and may act as an anchor for mobility between LTE and other 3GPP technologies.

PGW 325 may include one or more network devices, such as a gateway, a router, a modem, a switch, a firewall, a NIC, a hub, a bridge, a proxy server, an OADM, or some other type of device that processes and/or transfers traffic. PGW 325 may, for example, provide connectivity of user device 210 to external PDNs (e.g., PDN 365) by being a traffic exit/entry point for user device 210. For instance, PGW 325 may provide user devices 210 with access, via content filter server 250 and PDN 365, to content server 240. As such, the content made available to user devices 210, via PGW 325, may be subject to content filters and filtering policies implemented by content filter server 250. Additionally, in some implementations, network traffic between user devices 210 and content server 240, via PGW 325, may be monitored and analyzed by analytics server 230 as described above. PGW 325 may perform policy enforcement, packet filtering, charging support, lawful intercept, and/or packet screening. PGW 325 may also act as an anchor for mobility between 3GPP and non-3GPP technologies. In some implementations, PGW 325 may enforce content filtering in combination with, or as an alternative to, content filter server 250.

MME 330 may include one or more network devices that perform operations associated with a handoff to and/or from the EPS. MME 330 may perform operations to register user device 210 with the EPS, to handoff user device 210 from the EPS to another network, to handoff a user device 210 from the other network to the EPS, and/or to perform other operations. MME 330 may perform policing operations for traffic destined for and/or received from user device 210. MME 330 may authenticate user device 210 (e.g., via interaction with HSS/AAA server 350).

PCRF 335 may receive information regarding policies and/or subscriptions from one or more sources, such as subscriber databases and/or from one or more users. PCRF 335 may provide these policies to PGW 325 or another device so that the policies can be enforced. As depicted, in some implementations, PCRF 335 may communicate with analytics server 230 and/or content filter server 250 to enable telecommunications network 300 to operate in a manner described herein. For instance, policies managed by PCRF 335 may be updated based on the analysis and other operations of analytics server 230 and/or the content filters implemented by content filter server 250.

HSS/AAA server 350 may include one or more computing devices, such as a server device or a collection of server devices. In some implementations, HSS/AAA server 350 may include a device that gathers, processes, searches, stores, and/or provides information in a manner described herein. For example, HSS/AAA server 350 may manage, update, and/or store, in a memory associated with HSS/AAA server 350, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information.

CSCF 355 may include one or more computing devices, such as a server device or a collection of server devices that process and/or route calls to and from user device 210 via the EPC. For example, CSCF 355 may process traffic, received from PDN 365 that is destined for user device 210. In another example, CSCF 355 may process traffic, received from user device 210 that is destined for PDN 365.

PDN 365 may include one or more wired and/or wireless networks. For example, PDN 365 may include a cellular network (e.g., a 2G) network, a 3G network, a 4G network, a 5G network, a LTE network, a GSM network, a CDMA network, an EVDO network, or the like), a PLMN, and/or another network. Additionally, or alternatively, PDN 365 may include a LAN, a WAN, a MAN, the PSTN, an ad hoc network, a managed IP network, a VPN, an intranet, the Internet, a fiber optic-based network, and/or a combination of these or other types of networks.

Figure 4:
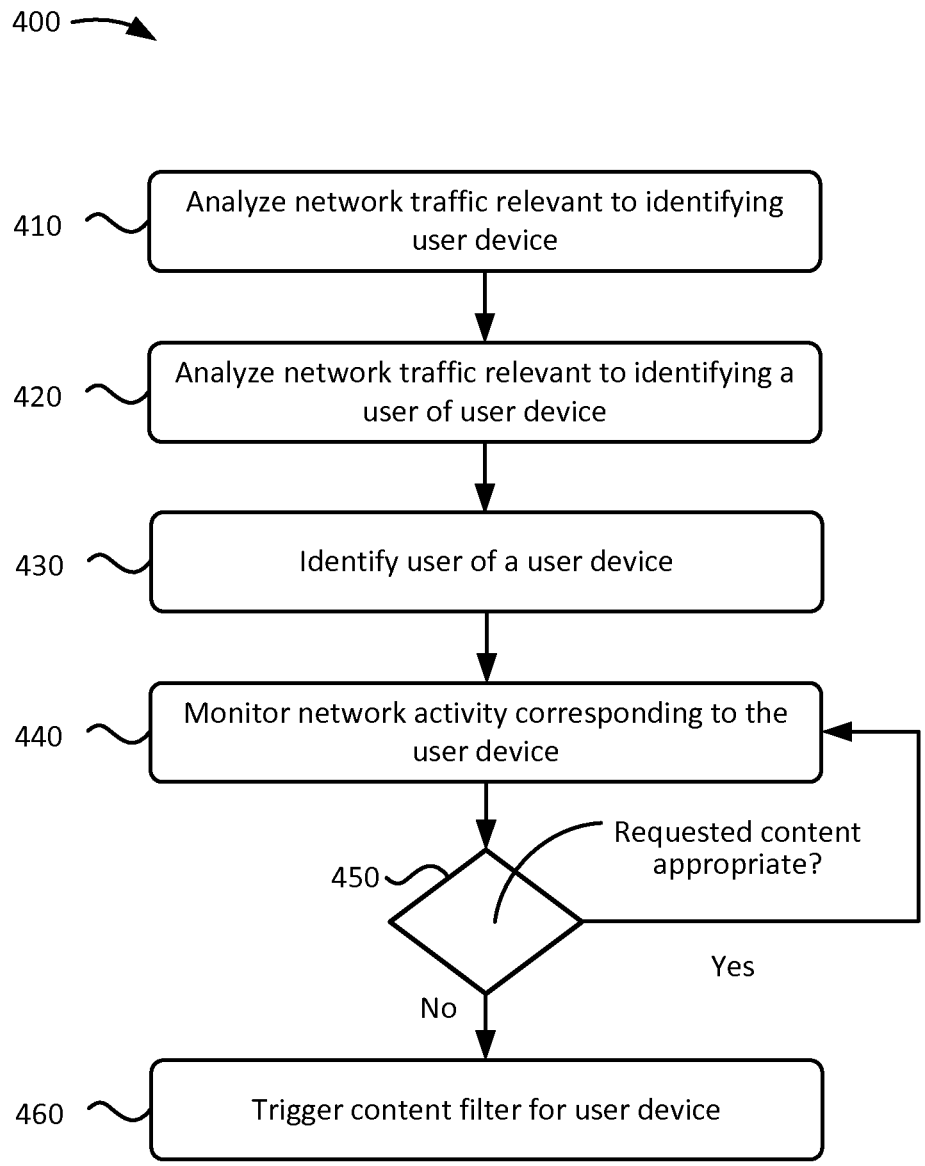
FIG. 4 is a flowchart diagram of an example process for triggering a content filter for a user device.

FIG. 4 is a flowchart diagram of an example process 400 for triggering a content filter for user device 210. Process 400 may be implemented by analytics server 230.

As shown, process 400 may include analyzing network traffic relevant to identifying user device 210 (block 410). For example, analytics server 230 may analyze network traffic corresponding to a user device 210 within a LAN. As mentioned above, server 230 may not have permission to access the local area network and monitor each user device 210 directly, and as a result, analytics server 230 may be resigned to monitoring network traffic between network device 220 and network 260.

In some implementations, the network traffic may correspond to a sequence of operations performed by user device 210 when user device 210 is turned on. For instance, the network traffic may include Uniform Resource Locators (URLs) that are accessed by user device 210 as part of a startup procedure or a Transmission Control Protocol (TCP) clock that begins when user device 210 is turned on. As described below in more detail, the device identification data may be collected by analytics server 230 over an extended period of time that allows for data patterns to emerge and become recognizable.

Process 400 may include analyzing network traffic relevant to identifying a user of user device 210 (block 420). For example, analytics server 230 may monitor network traffic for information, the type of content being accessed, the time of day of a particular type of activity, ports that are being used (e.g., by network device 220) to enable network communications for user device 210, URLs entered by a user or generated in response to an input from the user (e.g., when selected by a user in a web browser), etc. Additional examples of information that may be representative of a particular user may include software applications that are initiated by the user and User Agent (UA) strings corresponding to a particular browser that may be preferred by a user over another browser. As described in greater detail below, analytics server 230 may gather network traffic over an extended period of time, such that identifiable user patterns begin to emerge and are more recognizable.

Process 400 may include identifying a user of user device 210 (block 430). For example, analytics server 230 may analyze network traffic associated with user device 210 in order to identify the user that is currently operating user device 210. Identifying the user may include making an educated guess as to the age of the user (e.g., whether the user is a child, a teenager, or an adult) based on the network activity corresponding to the user device being operated by the user. Since not all content is appropriate for all ages, determining the age of the user may assist analytics server 230 in determining whether a content filter is appropriate and/or the type of content filter that is appropriate.

For example, analytics server 230 may determine that a particular user within a local area network (e.g., a home) operates a tablet computer each weekday morning at 7:00 AM and visits a sequence of websites that correspond to a child browsing the Internet (e.g., cartoon websites, mobile applications for learning letters and numbers, etc.), and that no websites or other network content typically directed to adults (e.g., news websites, public interest websites, etc.) are requested by the user during these times. As such, analytics server 230 may determine that the next time that a user: 1) operates the tablet computer; 2) on a weekday at 7:00 AM; and 3) begins by visiting websites directed to children, that the user is probably a child.

Process 400 may include monitoring network activity corresponding to user device 210 (440). For example, analytics server 230 may monitor data flows between user device 210 and content server 240. Analytics server 230 may determine the types of content requested by user device 210 and ascertain what types of audiences would be appropriate for receiving the content. For instance, analytics server 230 may determine whether user device 210 is accessing blogs, articles, pictures, videos, etc., that are directed to children, teenagers, or adults. In some implementations, analytics server 230 may evaluate the content in one or more ways, such as by identifying ratings information associated with the content, analyzing the content for certain words (e.g., vulgarity), identifying warnings associated with the content, determining age verification requirements associated with the content, image analysis, text analysis, etc.

Process 400 may include determining whether requested content is appropriate (block 450). For example, analytics server 230 may determine whether content is appropriate for a user by comparing an age (or an estimated age) of the user with the type of content requested by the user. In some implementations, analytics server 230 may also take into account other factors, such as content filtering policies that are already associated with the entire local area network (e.g., the home where the user is located). For instance, if the requested content violates a content filter that is already being applied to the local area network, then the content may be blocked regardless of the age of the user and the nature of the content.

When the content is appropriate (block 450—Yes), process 400 may include continuing to monitor the network activity of user device 210 (e.g., block 440). However, when the content is inappropriate (block 450—No), process 400 may include triggering a content filter for user device 210 (block 460). In some implementations, this may include analytics server 230 notifying content filter server 250 that a content filter should be applied to user device 210, and content filter server 250 may cause the inappropriate content to be blocked from user device 210. In some implementations, since a content filter appropriate for a child may not be necessary for a teenager or an adult, analytics server 230 may determine a type of content filter that is appropriate for the user and communicate to content filter server 250 what type of content filter is appropriate.

In some implementations, once the content filter is in place, analytics server 230 may continue to monitor network traffic corresponding to user device 210. However, since the content filter is in place, analytics server 230 may monitor the network traffic to determine if/when the user stops operating user device 210. In some implementations, once the network traffic indicates that the user is no longer operating user device 210, analytics server 230 may cause content filter server 250 to remove the content filter from user device 210 (which may result in having no content filter or switching to a default content filter associate with the local area network). As such, content analysis may be an ongoing task so as user device 210 is used by different people, content filters may be dynamically and appropriately applied.

Figure 5:
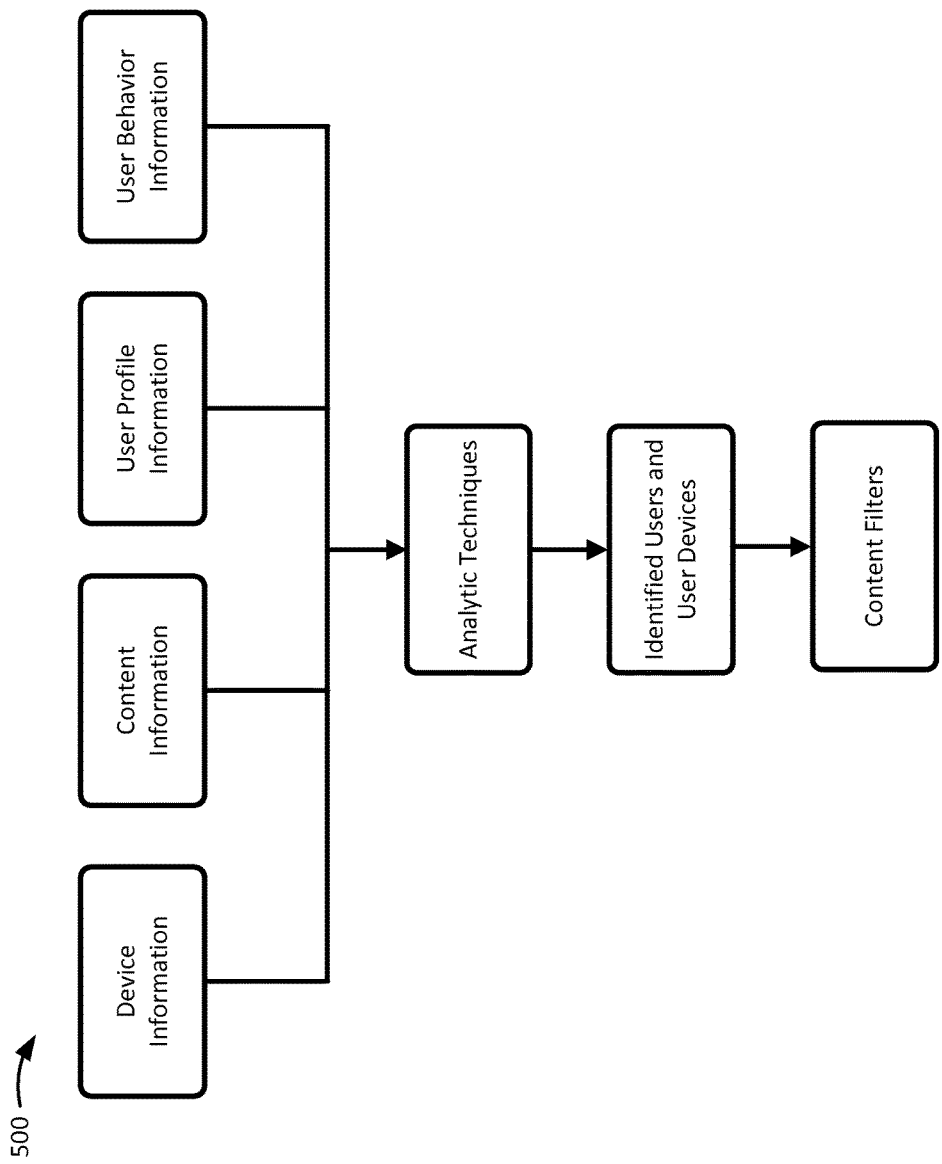
FIG. 5 is a logical flow diagram of an example for dynamically applying a content filter to a user device.

FIG. 5 is a logical flow diagram of an example for dynamically applying a content filter to user device 210. The information and operations represented by the logical flow diagram of FIG. 5 may be implemented by analytics server 230 or by a combination of analytics server 230 and content filter server 250. Additionally, in some implementations, the functionality of content filtering may be implemented by PGW 325.

As shown, analytics server 230 may use several types of information that may be used to dynamically apply a content filter to user device 210. Examples of such information may include device information, content information, user profile information, and user behavior information. Device information may include information describing user devices 210 that are available to users within a particular network (e.g., a local area network). For instance, device information may include a device type, such as a smart phone, a tablet computer, a laptop computer, etc. Device information may also include an operating system or other types of software installed on user device 210. Serial numbers, make, model, manufacture date, devices identifiers (e.g., a media access control (MAC) address, an international mobile subscriber identity (IMSI), an international mobile station equipment identity (IMEI), etc.), and a device name of user device 210 are also examples of potential device information.

However, in some implementations, device identifiers of user devices 210 may be hidden behind network device 220 such that analytics server 230 may not use device identifiers to identifier user devices 210. In such implementations, analytics server 230 may deduce which user devices 210 are being operated based on network traffic patterns originating from network device 220 (and not based on, for example, device identifiers such as a MAC, IMSI, etc.). A location of user device 210 within a home or network may also be an example of device information. Since users may have a tendency to use different user devices 210 for different activities, at different times of day, and at different locations, being able to identify the particular user device 210 that a user is operating may enhance the ability of analytics server 230 to predict the type of network content that the user may request and thus determine whether a content filter is appropriate.

Content information may include information that describes or relates to network content that a user (or user device 210) is accessing, has accessed, or has tried to access. Examples of network content may include websites, services (e.g., social networking, instant messaging, email, file sharing, etc.), books, articles, images, movies, etc. Content information may include times of day that network content is accessed, software applications used to access network content (e.g., a browser, a mobile application, etc.), the location of user device 210 while accessing the network content, whether other user devices 210 are being used while the network content is being accessed, etc.

User profile information may include information describing or relating to a user. Examples of user profile information may include a formal user profile or an information user profile. A formal user profile may include a user profile intentionally created by a user as part of, for example, registering to receive content filtering services or other types of networking services. An informal user profile may include a user profile that results from information (e.g., websites visited, browsing habits, etc.) collected by analytics server 230 and compiled in an attempt to define a particular user. Depending on the available information, user profile information may discretely define a particular user (e.g., an age, a gender, etc.) or merely give an impression of the user (e.g., whether the user is a child, teenager, and adult). User profile information may be helpful in determining whether network content is appropriate for a particular user and/or whether a content filter should be applied (or how strict the content filter should be).

User behavior information may include information about how a particular user tends to interact with user device 210. For instance, user behavior information may include times, days, and durations that a particular user operates user device 210. User behavior information may be real-time information and/or historical information. For instance, a child may primarily use smaller words and simpler inputs to interact with user device 210, whereas an adult may be more likely to use bigger words or more complex inputs to interact with user device 210, and a teenager may be more likely to use trendy inputs like emoticons, trending abbreviations, etc.

User inputs may be compared with different reference sets of data that are associated with different categories of users (e.g., children, teenagers, and adults) in order to identify a user. For example, emoticons, trending abbreviations, and pop culture references may be combined to create a reference set of data that is associated with teenage users. As such, if the network traffic associated with a particular user includes emoticons, trending abbreviations, and/or pop culture references, analytics server 230 may determine that the user is a teenager by comparing the network traffic to the reference set of data associated with teenage users. As such, user behavior information may be helpful in identifying a user. In addition, user behavior information may be helpful in anticipating what types of network content the user may request. For instance, user behavior information may help identify behavioral patterns or tendencies of a particular user, such as a sequence of websites and network services that are commonly accessed by the user.

Analytics server 230 may use the device information, the content information, the user profile information, and the user behavior information to identify user devices 210, users, and content filters that are likely to be needed at certain times, under certain conditions, for certain users, or on certain devices. As such, analytics server 230 may use the collected information for different reasons and in different ways. For instance, certain types of information may be given greater weight when trying to identify a user or predict the network content that the user may want to access. Additionally, while some types of information may be more relevant in making certain determinations, the information may be time-sensitive (e.g., only relevant at certain times, on certain days, etc.). For instance, a user may have different browsing habits at different times of day, so while one sequence of websites visited might be indicative of a particular user in the morning, another set of websites visited might be indicative of the same user in the evening. In addition, some types of information may be used in an attempt to create a model of the home or other networking environment (e.g., types and number of devices, number of users, etc.), and some types of information may be used to define usage models or patterns that may be used to predict specific user tendencies and behaviors.

Figure 6:
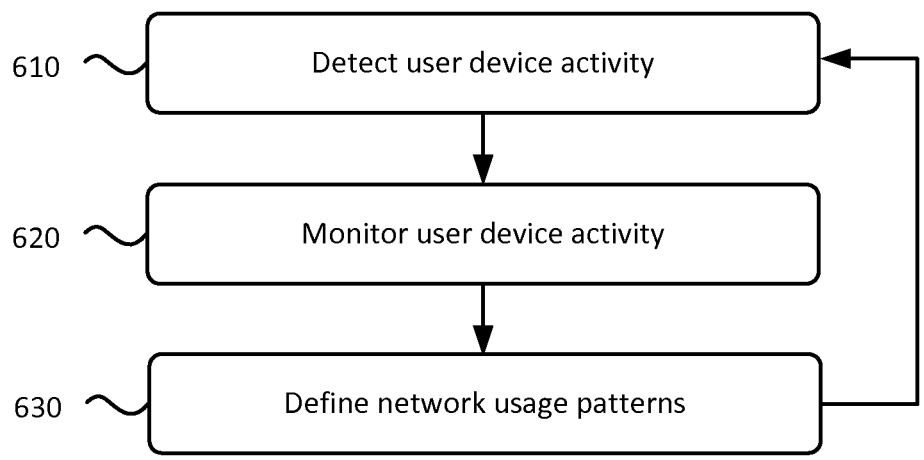
FIG. 6 is a flowchart diagram of an example process for defining network usage patterns.

FIG. 6 is a flowchart diagram of an example process 600 for defining network usage patterns. Process 600 may be implemented by analytics server 230.

As shown, process 600 may include detecting a user device (block 610). For example, analytics server 230 may detect user device activity corresponding to a local area network or another type of usage area. Analytics server 230 may not have direct access to data transfers occurring within the local area network, so analytics server 230 may detect user device activity based on data flowing to and from the local area network.

Process 600 may include monitoring user device activity (block 620). For example, analytics server 230 may access and record information that can help describe how many and what kinds of user devices 210 are available to users in the local area network, when the users tend to operate the user devices 210, what types of network content is being accessed, etc. Additional examples of information that may be monitored and collected by analytics servers are described above with reference to FIG. 6.

Process 600 may include defining a network model and usage patterns (block 630). For instance, analytics server 230 may use the information collected while monitoring user device activity to create a model of the local area network that includes user device. Analytics server may also use the information to define usage patterns that describe how and/or when a user operates user device 210. As depicted in FIG. 6, after defining a network model and usage patterns, analytics server 230 may repeat the operations of detecting user device activity and monitoring user device activity in order to continually update and improve the network model and usage patterns that define the users of user devices 210. In some implementations, analytics server 230 may become analytically refined enough to determine when user device 210 transitions from being used by one user to another user, which may result in a change in any content filters that are being applied to user device 210.

Figure 7:
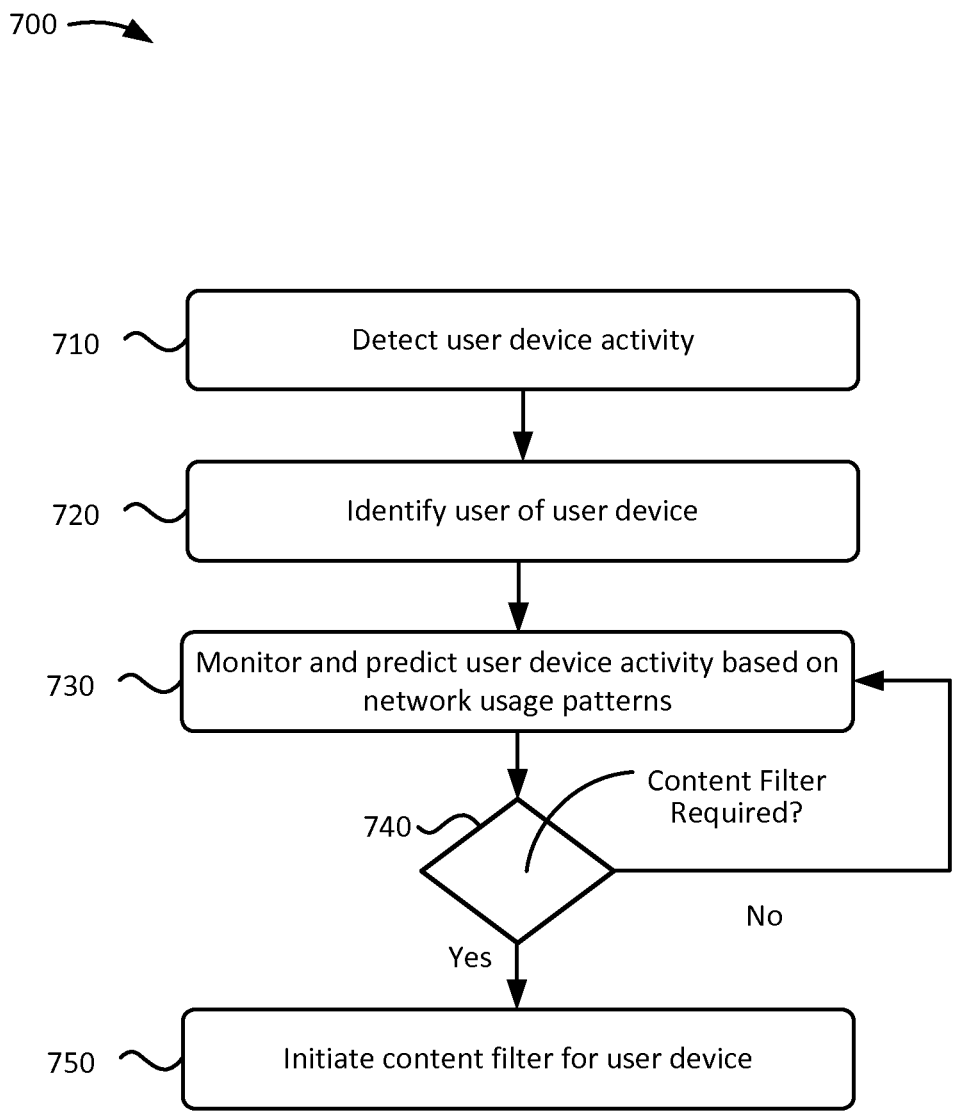
FIG. 7 is a flowchart diagram of an example process for applying content filters based on predicted user device activity.

FIG. 7 is a flowchart diagram of an example process 700 for applying content filters based on predicted user device activity. Process 700 may be implemented by analytics server 230.

Applying content filters based on predicted user device activity may be helpful in scenarios where it is difficult or impossible to determine the identity and age of the user. For example, friends or relatives may periodically visit the home and access the Internet via a local area network within the home. In such a scenario, analytics server 230 may have little or no information regarding the individual or the individual's network activity habits. This lack of information may make it difficult for analytics server 230 to accurately identify the user and have an appropriate content filter applied to the corresponding user device. As such, analytics server 230 may rely on behaviors, patterns, and information relating to other individuals in order to predict whether the unidentified user requires a content filter and what type of content filter is appropriate, As shown, process 700 may include detecting user device activity (block 710). Process 700 may also include identifying a user of user device 210 (block 720). These operations, or analogous operations, that have already been discussed above and an additional description of these operations is not warranted (see, e.g., FIG. 4 and the description corresponding thereto). Furthermore, as discussed above, analytics server 230 may not have adequate information to accurately identify user device 210 and/or the user operating user device 210.

Process 730 may include monitoring and predicting user device activity based on network usage patterns (block 730). For example, analytic device 230 may compare network activity of the unidentified user with historical network activity of known users in order to make a prediction as to whether a content filter is warranted. In some implementations, there may be a significant number of usage patterns available and analytic server 230 may identify the usage pattern that is most analogous to the current situation and whether a content filter is warranted. In some implementations, analytics server 230 may use additional, or alternative, predictive tools in order to determine whether a content filter would be appropriate. In addition, the degree of sensitivity used to determine whether a content filter is required may vary from one scenario to another. For instance, based on the historical network activity of known users, a pattern may arise where mature content tends to be accessed at night. Consequently, when an unidentified user begins accessing network content at night, analytics server 230 may increase a level of sensitivity with respect to determining whether a content filter is appropriate (and/or the type of content filter that is appropriate).

When a content filter is not needed (block 740—No), process 700 may proceed with monitoring user device activity and making another prediction at a later time (see, e.g., block 730). However, when a content filter is required (block 740—Yes), process 700 may include initiating a content filter for user device 230 (block 750). In some implementations, analytics server 230 may initiate the content filter by communicating a request to content filter server 250 to have a content filter applied to the network activity of user device 230. Additionally, analytics server 230 may identify an appropriate content filter depending on the circumstances (e.g., the user).

Figure 8:
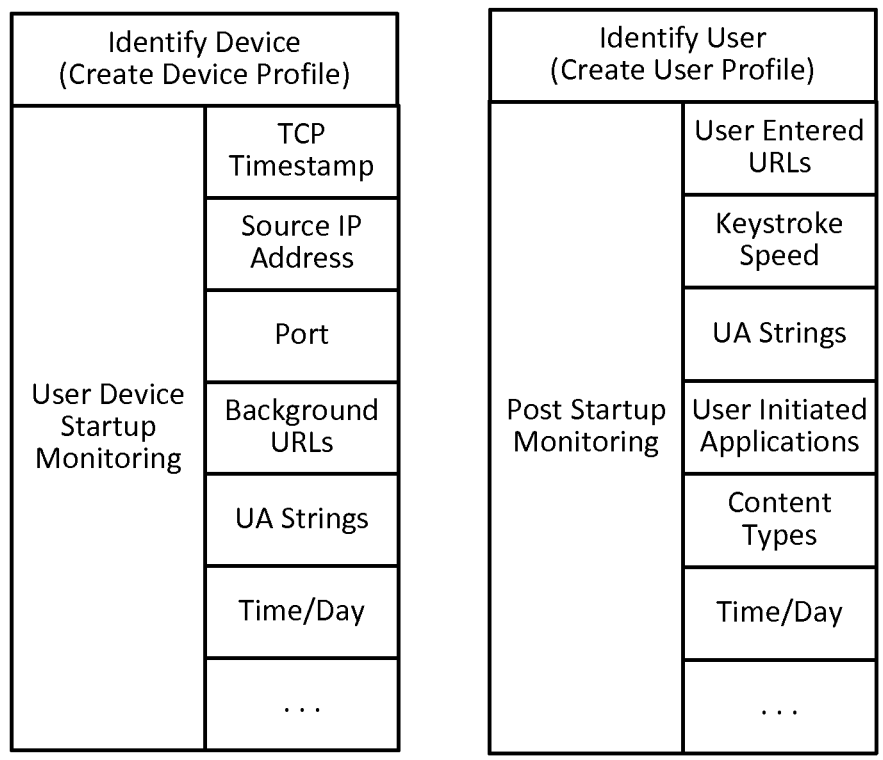
FIG. 8 is a block diagram representing data types that may be used to identify a user device and data types that may be used to identify a user of the user device.

FIG. 8 is a block diagram representing data types that may be used to identify user device 210 and data types that may be used to identify a user of user device 210. As shown, analytics server 230 may be capable of identifying user devices 210 that are located within a local area network by monitoring a data stream (e.g., TCP streams) for certain types of network traffic.

For instance, analytics server 230 may monitor a data stream for TCP timestamp information that may indicate that a particular user device 210 has recently been powered on. Analytics server 230 may combine this information with a source IP address and a port number associated with the TCP timestamp in order to identify other types of network traffic associated with the user device 210 that has just been powered on. For instance, analytics server 230 may identify startup or background URLs that are contacted as user device 210 executes startup functions, such as syncing user device 210 with various data sources (e.g., news sources, stock information, weather, check for updates, etc.). In some implementations, startup functions may be assumed to be functions that are performed close to the TCP timestamp associated with the source IP address and port number (e.g., within a particular amount of time from the TCP timestamp, such as within five minutes, within ten minutes, etc.). Additionally, startup functions may be used to identify user device 210, as opposed to the user of user device 210, because they are performed by user device 210 when user device 210 is powered on (e.g., automatically, and not based on actual user interactions or behavior). In some implementation, another type of network traffic, other than a TCP timestamp, may be used to indicate that user device 210 has recently powered on.

The network traffic associated with the port and source IP address may also be monitored for UA strings that may indicate a particular type of browser (along with the browser version) that has just been opened, which may also be accompanied by default URL information corresponding to the browser. Each type of information collected by analytics server 230 may be associated with a current time in order to, for example, determine the sequence in which user device 210 performs startup operations.

Analytics server 230 may also monitor the post startup data stream of user device 210 in order to identify a user since, for example, startup operations (e.g., operations automatically performed by user device 210 in response to powering on) may be performed by user device 210 regardless of user input. A post startup operation may be assumed to be network traffic that occurs after startup operations are completed, which may be after a selected period of time measured from the TCP timestamp or after a spike in network traffic associated with the TCP timestamp. As shown, post startup information that may be useful in identifying a user may include URLs entered by a user, whether by typing, selecting a link in a webpage or application, or by executing a software application. A keystroke speed may also be indicative of a particular user as some users rely more on auto-complete or auto-fill options when inputting information into a browser or other type of network-reliant program.

UA streams may be helpful in identifying a user since, for example, some users tend to prefer one type of browser over another type of browser. In a similar sense, user-initiated applications may help identify a user since users will often use different types of software programs or mobile applications. Content type may also be helpful because users may not have the same interests or preferences regarding network content. Time and day information may also help identify a user since, for example, users may cause user device 210 to execute operations at different times, in different sequences, at different days of the week, etc. As such, analytics server 230 may monitor a network data stream at different times and for different types of information in order to identify users and user devices 210 that are within a local area network or another type of inaccessible situation.

FIG. 9 is a diagram of example components of a device 900. Each of the devices illustrated in FIGS. 1-3 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 4-7, the order of the blocks may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a server device, comprising:
   receiving, by the server device, network traffic from a plurality of user devices;
   identifying, by the server device, a particular user device, of the plurality of user devices, by analyzing the network traffic that is associated with the plurality of user devices;
   identifying, by the server device and based on the network traffic, a particular user of the particular user device by:
      determining a usage pattern of the particular user device by analyzing the identified network traffic associated with the particular user device,
      comparing the determined usage pattern of the particular device to a plurality of user profiles that each correspond to a respective user of a plurality of users, wherein each of the user profiles further indicates a usage pattern associated with a corresponding respective user, and
      determining, based on the comparing, that the usage pattern, determined based on analyzing the identified network traffic associated with the particular user device, corresponds to a particular usage pattern indicated by particular user profile information associated with a particular user, of the plurality of users;
   monitoring, by the server device, network content requested by the particular user device;
   identifying, by the server device, a particular content filter policy associated with the particular user, wherein the particular content filter policy indicates parameters of content that is not appropriate for the particular user, wherein the particular content filter policy is different from one or more other content filter policies associated with one or more other users of the plurality of users;
   determining, by the server device, whether the requested network content is appropriate for the particular user based on a comparison of the network content and the particular content filter policy associated with the particular user;
   initiating, by the server device, a content filter service for the particular user device when determining that the network content is not appropriate for the particular user; and
   forgoing initiating, by the server device, the content filter service for the particular user device when determining that the network content is appropriate for the particular user.

2. The method of claim 1, wherein initiating the content filter service includes notifying a content filter server to apply a content filter to the network content requested by the particular user device.

3. The method of claim 1, wherein the particular content filter policy is a first content filter policy, the method further comprising:
   continuing to monitor network traffic associated with the particular user device after the initiating or the forgoing of the initiating of the content filter service;
   identifying, based on the continuing to monitor, that another user is using the particular user device;

monitoring additional network content requested by the particular user device after identifying that the other user is using the particular user device;

determining whether to initiate the content filter service to filter the additional network content, based on a comparison of the network content and a second content filter policy associated with the other user; and initiating or forgoing initiating the content filter service for the particular user device, to filter the additional network content, in accordance with the second content filter policy, based on determining whether to initiate the content filter service.

4. The method of claim 1, wherein the server device is part of a wireless telecommunications network in communication with a local area network to which the particular user device is connected.

5. The method of claim 1, wherein:
identifying the particular user device includes monitoring network traffic associated with startup operations of the particular user device, and
identifying the particular user includes monitoring network traffic associated with post-startup operations of the particular user device.

6. The method of claim 1, further comprising:
monitoring network activity associated with the particular user; and
updating the particular user profile information associated with the particular user based on the monitored network activity.

7. The method of claim 6, wherein updating the particular user profile information includes enhancing an existing user profile of the particular user by updating the existing user profile with the monitored network activity.

8. The method of claim 1, wherein the particular user is identified based on:
at least one Uniform Resource Locator (URL) associated with content accessed by the particular user device, and
a date corresponding to the accessing of the content associated with the at least one URL and a time of day corresponding to the accessing of the content associated with the at least one URL.

9. The method of claim 1, wherein the particular user is identified based on:
whether a keystroke speed, of input received by the particular user device, is associated with a keystroke speed of the particular user indicated by the particular user profile information, and
whether at least one application, initiated after the particular user device has completed startup operations, matches at least one application indicated by the particular user profile information.

10. A server device comprising:
a non-transitory memory device storing a plurality of processor-executable instructions; and
a processor configured to execute the processor-executable instructions, wherein executing the processor-executable instructions causes the processor to:
receive network traffic from a plurality of user devices;
identify a particular user device, of the plurality of user devices, by analyzing the network traffic that is associated with the plurality of user devices;
identify, based on the network traffic, a plurality of websites accessed by the particular user device during a particular time window;
compare the plurality of websites, accessed by the particular user device during the particular time window, to a plurality of user profiles that each correspond to a respective user of a plurality of users, wherein each of the user profiles further indicates a usage pattern associated with a corresponding respective user, the usage pattern including a set of websites accessed by the respective user;
determine that the identified plurality of websites, accessed during the particular time window, correspond to usage patterns indicated by particular user profile information associated with a particular user;
identify that the particular user is associated with the particular user device during the particular time window based on the determination that the identified plurality of websites, accessed during the particular time window, correspond to the usage patterns indicated by the particular user profile information associated with the particular user;
monitor network content requested by the particular user device;
identify a particular content filter policy associated with the particular user, wherein the particular content filter policy indicates parameters of content that is not appropriate for the particular user, wherein the particular content filter policy is different from one or more other content filter policies associated with one or more other users of the plurality of users;
determine whether the requested network content is appropriate for the particular user based on a comparison of the network content and the particular content filter policy associated with the particular user;
initiate a content filter service for the particular user device when determining that the network content is not appropriate for the particular user; and
forgo initiating the content filter service for the particular user device when determining that the network content is appropriate for the particular user.

11. The server device of claim 10, wherein, to initiate the content filter service, the processor-executable instructions further cause the processor to:
notify a content filter server to apply a content filter to the network content requested by the particular user device.

12. The server device of claim 10, wherein the server device is part of a wireless telecommunications network in communication with a local area network to which the particular user device is connected.

13. The server device of claim 10, wherein the processor-executable instructions, to identify the particular user device, include processor-executable instructions to:
monitor network traffic associated with startup operations of the particular user device,
monitor network traffic associated with post-startup operations of the particular user device, and
determine that the network traffic associated with the startup operations and the post-startup operations match startup and post-startup network traffic patterns, respectively, associated with the particular user profile information.

14. The server device of claim 10, wherein the processor-executable instructions further cause the processor to:
monitor network activity associated with the particular user; and
update the particular user profile information associated with the particular user based on the monitored network activity.

15. The server device of claim 14, wherein, to update the particular user profile information, the processor-executable instructions further cause the processor to:
enhance the particular user profile information of the particular user by adding information, associated with the monitored network activity, to the particular user profile information.

16. The server device of claim 10, wherein the particular user is further identified based on a date corresponding to the accessing of the plurality of websites and a time of day corresponding to the accessing of the plurality of websites.

17. The server device of claim 10, wherein the particular user is identified further based on:
whether a keystroke speed, of input received by the particular user device, is associated with a keystroke speed of the particular user indicated by the particular user profile information, and
whether at least one application, initiated after the particular user device has completed startup operations, matches at least one application indicated by the particular user profile information.

18. A server device, comprising:
a non-transitory memory device storing a plurality of processor-executable instructions; and
a processor configured to execute the processor-executable instructions, wherein executing the processor-executable instructions causes the processor to:
detect network traffic corresponding to a user device;
compare the network traffic to historical network usage patterns associated with a plurality of user profiles respectively associated with a plurality of candidate users, wherein each of the user profiles further indicates a usage pattern associated with a corresponding respective user;
identify a particular user of the user device, out of the plurality of candidate users, based on comparing the network traffic to the historical network usage patterns associated with the plurality of user profiles associated with the plurality of candidate users;
determine, based on identifying the user, that a content filter should be applied for content sent to the user device; and
initiate, based on determining that the content filter should be applied, a content filter service for content sent to the user device.

19. The server device of claim 18, wherein the historical network usage patterns include:
a Transmission Control Protocol (TCP) timestamp,
at least one port associated with the network traffic,
at least one Uniform Resource Locator (URL) associated with a startup operation of the user device, or
at least one User Agent (UA) string associated with the user device.

20. The server device of claim 18, wherein the historical network usage patterns include
at least one type of network content requested by the user device.

* * * * *